United States Patent [19]

Howitt

[11] Patent Number: 5,003,348

[45] Date of Patent: Mar. 26, 1991

[54] MULTI-FUNCTION NEGATIVE CARRIER

[75] Inventor: George Howitt, River Edge, N.J.

[73] Assignee: Charles Beseler Company, Linden, N.J.

[21] Appl. No.: 502,179

[22] Filed: Mar. 30, 1990

[51] Int. Cl.$^5$ ............................................. G03B 27/62
[52] U.S. Cl. ................................................. 355/75
[58] Field of Search ..................................... 355/75, 76

[56] References Cited

U.S. PATENT DOCUMENTS

| | | | |
|---|---|---|---|
| 2,198,169 | 4/1940 | Kallusch | 355/76 |
| 2,249,228 | 7/1941 | Rogers | 355/76 |
| 2,266,908 | 12/1941 | Rogers | 355/76 |
| 2,985,068 | 5/1961 | Ness | 355/75 |
| 3,397,613 | 8/1968 | Kallenberg | 355/75 |
| 4,161,365 | 7/1979 | Anderson et al. | 355/75 |
| 4,181,428 | 1/1990 | Proulx | 355/75 |
| 4,353,646 | 10/1982 | Bartel et al. | 355/75 |
| 4,396,281 | 8/1983 | Okabe et al. | 355/75 |
| 4,450,536 | 5/1984 | Schroeder | 355/75 |
| 4,455,082 | 6/1984 | Lepist | 355/75 |

*Primary Examiner*—Richard A. Wintercorn
*Attorney, Agent, or Firm*—Darby & Darby

[57] ABSTRACT

A negative carrier for use with photographic enlargers consists of two main sections, an upper mounting plate and a lower mounting plate interlocked together to secure and flatten the perimeter of a negative film strip during enlarging when the strip is in registration with aligned central rectangular apertures formed in each plate. Fixed pins located symmetrically about the central aperture on the upper surface of the lower plate have shaft and head portions to establish and maintain alignment of the inserted negative film strip with respect to the central aperture of the lower plate so that frames of the negative film strip may be slid into registration with the central aperture. The upper surface of the upper mounting plate is provided with protruding tabs for holding mounted slides and flexible filter sheets in alignment with the central aperture. In a second embodiment, a rear holding tab is located on the upper surface of the upper mounting plate at a sharp angle toward the front wall to facilitate easy filter sheet insertion while preventing rearward displacement of the sheet. Since the filter sheet is longer than the distance between the tab and the front wall, a curvature of the sheet will be promoted, and, owing to its resilient nature, the sheet will hold itself in place.

8 Claims, 2 Drawing Sheets

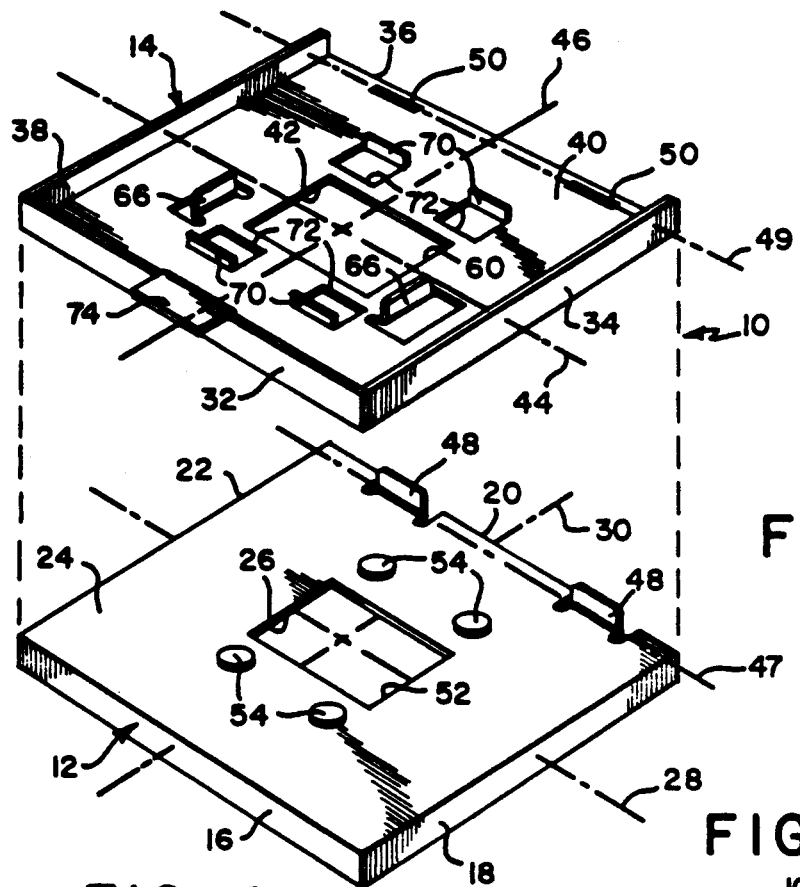
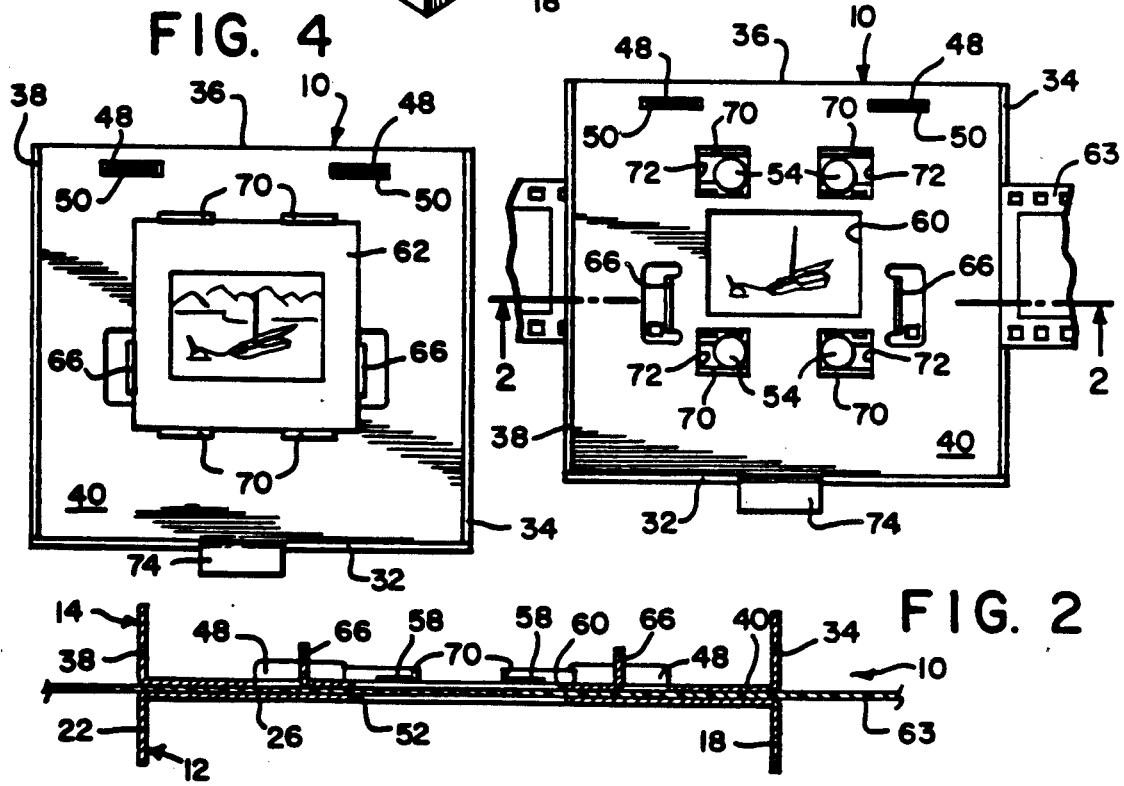

MULTI-FUNCTION NEGATIVE CARRIER

The present invention generally relates to photographic equipment, and more particularly, to an improved negative carrier for use with photographic enlargers.

There are many different types of carriers for holding a single negative frame or a negative strip in position during the image-enlarging process of photography. The typical enlarger includes a slot for receiving and holding the carrier in such a manner that when the carrier is inserted, one frame of the negative lies in the path of the projected enlarger light. Depending on the size of the film used, an appropriate carrier is used to hold it in position within the enlarger. Some film sizes include 35 mm, 110 mm, mounted slides, and the larger format films.

The film strip or single frame is typically held between two plates. The particular frame of interest is centered about a rectangular aperture of the plates so that light from within the enlarger housing may project the image of the frame to a remote surface, such as an easel, and maintain proper straight boarders.

At times during the enlarging procedure it becomes necessary to place a filter in the path of projected light before or after the negative image and before the light reaches the easel. Such filters come in various formats including flexible plastic filters, framed filters, and hard filters. Some enlargers provide a separate slot above or below the carrier slot for accommodating the filters. Otherwise the filters are mounted on a filter support which is usually fixed below the lens of the enlarger. Although the mount can pivot into and out from the path of the projected image, it can be cumbersome if filters are not used, and due to its opaque supporting portions, can accidentally obstruct portions of the projected image.

It is an object of the present invention to provide an inexpensive negative film carrier that can hold and properly align at least two different types of film negatives and support and align a filter.

BRIEF DESCRIPTION OF THE DRAWINGS

FIG. 1 is an isometric view of a the present negative carrier showing a lower mounting plate separated from an upper mounting plate in accordance with the present invention;

FIG. 2 is a cross-sectional view of the negative carrier taken along the lines 2—2 of FIG. 3 showing the upper and lower mounting plates engaged in accordance with the present invention;

FIG. 3 is a top plan view of the negative carrier showing a negative strip in a mounted position in accordance with the present invention;

FIG. 4 is a top plan view of the negative carrier showing a mounted slide in a mounted position in accordance with the present invention;

DETAILED DESCRIPTION OF THE PREFERRED EMBODIMENT

Figure 5:
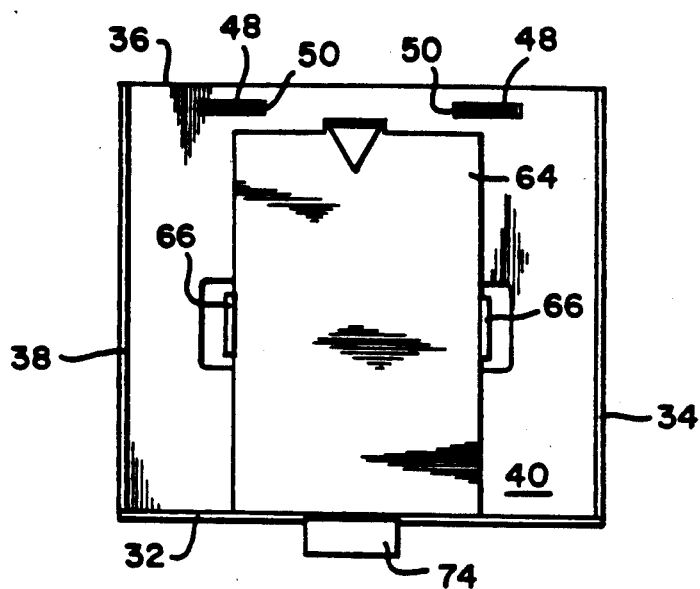
FIG. 5 is a top plan view of the negative carrier showing a filter sheet in a mounted position in accordance with the present invention.

The negative carrier 10 of the present invention consists of only two main sections, a lower mounting plate 12 and an upper mounting plate 14, which interlock together and secure a negative during an enlarging procedure.

Both lower and upper plates are preferably made from a sheet metal such as steel or aluminum, but of course could also be made in any material using any appropriate process, such as thermoforming in plastic.

In order to more clearly explain the various elements located on the two mounting plates 12, 14, the following orientation is given with respect the Figures.

The lower mounting plate 12 includes a front wall 16, a right side wall 18, a rear edge 20, a left side wall 22, an upper surface 24, a lower surface 26, a side-to-side central axis 28 which runs parallel to the front wall 16 and a front-to-rear central axis 30 which runs parallel to both side walls, right 18 and left 22. The front, right and left walls 16, 18 and 22, respectively, are all directed downwardly from the upper surface 24.

Similarly, the upper mounting plate 14 includes a front wall 32, a right side wall 34, a rear edge 36, a left side wall 38, an upper surface 40, a lower surface 42, a side-to-side axis 44 and a front-to-rear axis 46. The front, right side, and left side walls 32, 34 and 38, respectively, are all directed upwardly from the lower surface 42.

Located along a hinge axis 47 adjacent and parallel to the rear edge 20 of the lower mounting plate 12 are two upwardly directed hinge tabs 48, spaced symmetrically with respect to the front-to-rear axis 30 and having a predetermined width along the hinge axis 47. The thickness of each hinge tab 48 is equal to the thickness of the material used for the construction of the mounting plates 12, 14.

Located along another hinge axis 49 adjacent and parallel to the rear edge 36 of the upper mounting plate 14 are two hinge slots 50 which are symmetrically aligned with respect to the front-to-rear axis 46, and have an opening dimension, as measured along the hinge axis 49, which is slightly greater in magnitude than the width of the hinge tabs 48. The purpose of the hinge slots 50 is to receive the two hinge tabs 48 during assembly of the two mounting plates 12, 14, and create an operational hinge between the two mounting plates 12, 14, once assembled. Each hinge slot 50 will receive one hinge tab 48 when the lower surface 42 of the upper plate 14 is positioned near the upper surface 24 of the lower mounting plate 12 and the front orientation of both mounting plates 12, 14 is consistent.

Once the mounting plates 12, 14 are engaged (hinge tabs 48 into hinge slots 50), the two defined hinge axes 47, 49 will lie parallel and adjacent to each other and will generally function as a single hinge axis about which the upper mounting plate 14 may be displaced with respect to the lower mounting plate 12. The engagement of the tabs 48 into the slots 50 will however, prevent rotational displacement within a shared plane which is defined by the upper surface 24 and the adjacent lower surface 42 of the two abutting mounting plates 12, 14.

Apart from the hinge tabs 48, the lower mounting plate 12 includes a generally central rectangular aperture 52 which is sized to correctly frame the image of a mounted slide 62 or one image of one frame of a negative strip 63, depending on which image medium is used.

The lower mounting plate 12 also includes at least four negative strip hold-down pins 54. The pins 54 are preferably in the form of aluminum rivets and include a shaft portion and a head portion. The pins 54 are fixed to the lower mounting plate 12 so that their head and shaft portions protrude upwardly above the upper surface 24. The pins 54 are arranged symmetrically about the central aperture 52, one pin 54 generally adjacent each corner of the central aperture 52. The function of the pins 54 is to establish and maintain alignment of an inserted negative strip with respect to the central aperture 52 during use of the negative carrier 10. The head portions and the shaft portions of the front and rear pairs of pins 54 together with the upper surface of the lower mounting plate 12 define two holding channels, a rear channel, and a front channel, respectively. The holding channels are parallel to the side-to-side axis 28 and both face each other and the central aperture 52. The holding channels are spaced from each other so that the edges of an inserted negative strip 63 are snugly received by the channels and a particular frame held in alignment with respect to the central aperture 52. The holding channels only prevent an inserted negative strip 63 from being displaced along the front-to-rear axis 30. The negative strip can be slid after insertion along the side-to-side axis 28 so that the user of the negative carrier may easily select any frame of the inserted negative strip 63 without removal of the carrier 10 from an enlarger. The head portions of the pins 54 prevent lifting of an inserted negative strip from the upper surface of the lower mounting plate 12 when the two plates 12, 14 are separated.

The upper mounting plate 14 includes a central aperture 60 which aligns with the central aperture 52 of the lower mounting plate 12 so that a selected image can be properly framed. The function of the apertures 52, 60, apart from forming a straight-lined opaque frame around a particular image frame of film, is to flatten the perimeter of the selected image frame of an inserted negative strip 63. Strip negatives have a tendency to curve in towards the emulsion surface. During enlarging, this curved surface of the negative strip prevents consistent focus across the entire image plane, leaving un-focused regions or distorted image features of any process print. The inside perimeters of the apertures 52, 60 provide a rigid surface between which the selected frame of a negative strip may be flattened, forcing the entire image into a single focusing plane.

The upper mounting plate 14 also includes upwardly protruding tabs for holding a mounted slide 62 and a filter sheet 64 in alignment with respect to the central aperture during the enlarging process, as discussed below.

The filter sheet 64 is a flexible sheet of colored plastic which is used to control the wavelengths of light reaching the photographic paper. The filter sheet 64 is intended to be positioned above either the mounted slide 62 or the negative strip 63 so that it filters all the light passing through the central apertures 52, 60 of the assembled carrier 10. Two side filter tabs 66 are provided with the upper mounting plate 14 for holding the filter sheet in position with respect to the central aperture 60. The filter tabs 66 protrude upwardly from the lower surface of the upper mounting plate 14 a predetermined distance. The filter tabs 66 preferably do not rise above the height of the peripheral side walls 34 and 38 or the front wall 32. The filter tabs 66 prevent the filter sheet 64 from being displaced along the side-to-side axis 44 during handling of the carrier 10. The front wall 32 of the upper mounting plate 14 functions as a filter tab by preventing filter sheet displacement towards the front of the carrier during its handling.

In another embodiment, the filter sheet 64 is also provided with a rear holding tab 68 which also protrudes above the upper surface of the upper mounting plate 14. The optional rear filter tab 68 is preferably disposed at a sharp angle towards the front wall 32 so that the back edge of the filter sheet 64 can be caught by the hook-like rear filter tab 68, facilitating easy filter insertion and preventing rearward displacement of an installed filter sheet. The rear filter tab 68 also promotes a curvature to the flexible filter sheet 64, which is preferably longer than the distance between the rear filter tab 68 and the inside surface of the front wall 32. The curvature of the filter sheet is used to hold the filter sheet in position with its own resilient characteristics by pushing itself between the rear filter tab 68 and the inside wall surface of the front wall 32. The filter sheet 68 will arch over the aperture 60 and slide tabs holding an optional mounted slide 62 (discussed below), but will not rise above the height of the side walls 42 and 38 or the front wall 32. In this embodiment, the resilient nature of the filter sheet 64 will hold itself in place on the upper mounting plate over the aperture without the said of the above-mentioned side filter tabs 66. The front wall 32 is preferably disposed rearwardly at a slight angle from the vertical.

The upper mounting plate 14 in the preferred embodiment also includes slide tabs 70 for holding an optional mounted slide 62 correctly over the aperture 60. The slide tabs 70 project upwardly from the upper surface 40 of the plate 14 a predetermined distance which is less than the height of the side filter tabs 66 and preferably no higher than the thickness of a mounted slide positioned flat on the upper surface 40. There are preferably four slide tabs 70 positioned symmetrically on the plate 14 with respect to the central aperture 60, one front pair, left side and right side, and one rear pair, left side and right side. The front pair of slide tabs 70 must be separated from the rear pair by a distance substantially equal to two inches in order to accommodate a mounted slide 62 whose standard dimensions are two inches square. The opposing slide tabs 70 center a mounted slide over the central aperture 60 and prevent lateral displacement along the front-to-rear axis 46. The filter tabs 66 also function as slide tabs by preventing transverse displacement along the side-to-side axis 44. The filter tabs 66 are therefore preferably two inches apart for accommodating the mounted slide 62.

Furthermore, the filter sheets must greater in width than the central aperture 60 but are preferably two inches wide so that the filter tabs 66 can provide a snug retention an prevent side-to-side filter sheet displacement, as discussed above.

Located adjacent to and rear of each of the front pair of slide tabs 70 and adjacent to and forward of each of the rear pair of slide tabs 70 lies a clearance aperture 72 for providing clearance to the head portions of the upwardly protruding pins 54 of the lower mounting plate 12. In order to ensure that the upper surface 24 of the lower mounting plate 12 contacts the lower surface 42 of the upper mounting plate 14 when assembled and that both of these contacting surfaces lie in a common plane, the protruding pins 54 must rise above the common plane and not obstruct assembly between the plates 12, 14. Each pin 54 is positioned on the lower mounting plate 12 in alignment with one respective clearance aperture 72 of the upper mounting plate 14 so that during plate assembly, the otherwise obstructing portions of the pins 54 will be accommodated by the clearance apertures 72.

Finally, the upper mounting plate 14 includes a gripping tab 74 for facilitating separation of the upper mounting plate 14 from the lower mounting plate 12.

As stated above, an object of the present invention is to provide a inexpensive, multi-function negative carrier without introducing complexity in either the product or the manufacture of the product. To accomplish this object, both plates can be made with a minimum of manufacturing steps.

Figure 6:
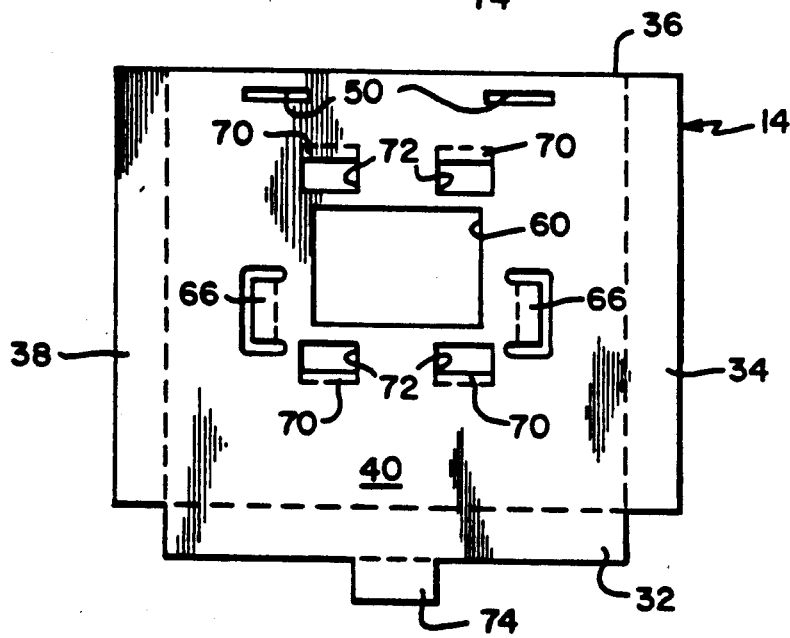
FIG. 6 is a top plan view of a blank version of the upper mounting plate in accordance with the present invention.
Figure 7:
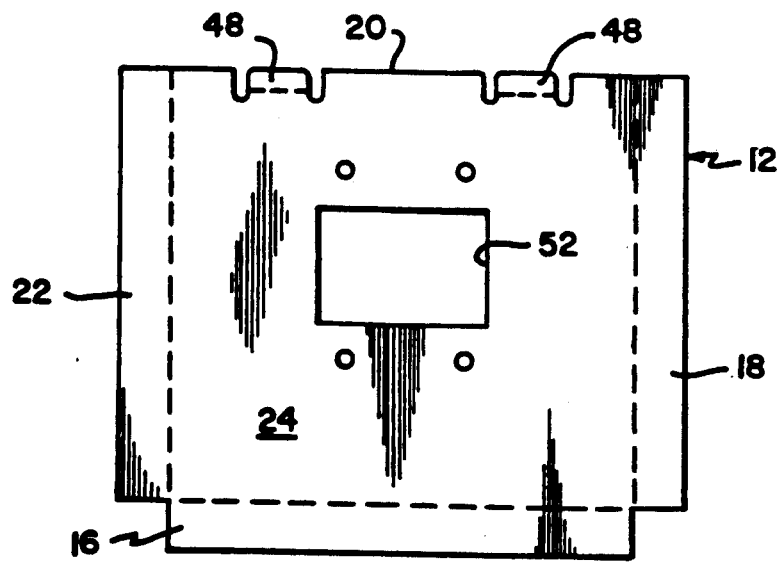
FIG. 7 is a top plan view of a blank version of the lower mounting plate in accordance with the present invention.

The upper mounting plate 14 is made by stamping a lay-out version, as shown in FIGS. 6 and 7, from sheet metal stock, such as sheet steel. The cut-outs are all made simultaneously using an appropriate stamping die. The lay-out version of the upper mounting plate 14 is then bent along predetermined lines using any effective method so that the protruding portions are formed.

The lower mounting plate 12 can be formed in a similar fashion to the manufacture of the upper mounting plate with the addition step of securing mounting pins 54.

In operation of the present negative carrier 10 using a filter sheet 64 and a negative strip 63, the negative strip 63 is first positioned in the front and rear channel defined by the pins 54 and slid across the upper surface 24 of the lower mounting plate 12 along the side-to-side axis 28 until a selected frame of the strip 63 becomes aligned (approximately) with the central aperture 52. The upper mounting plate 14 is then positioned onto the lower mounting plate 12, engaging the hinge tabs 48 with the hinge apertures 50. The upper mounting plate 14 will lie flush on the upper surface 24 of the lower mounting plate 12 and flatten the negative strip 63. A selected filter sheet 64 is positioned onto the upper surface 40 of the upper mounting plate 14 between the side filter tabs 66 and against the inside surface of the front wall 32.

At this point, the assembled carrier 10 is inserted into a carrier slot of the enlarger. The carrier slot can either be one of fixed dimensions or of the type that can be enlarged by movement of a lever arm (not shown) between a closed position and an open position. In this preferred embodiment, a carrier slot of fixed dimensions is contemplated. The magnitude of the width of the slot should be no greater than the magnitude of the combined heights of the side and front walls of the assembled mounting plates 12, 14. After insertion of the carrier 10 into the slot, the side and front walls of both plates 12, 14 lie outside the slot and function as a light barrier preventing internal light escaping the controlled path through the central apertures 52, 60 and inadvertently exposing the photographic paper. The width of the slot is large enough to accommodate the height of the filter tabs 66 (which extend the furthest from the upper surface 40 of the upper mounting plate 14.

Continuing with the operation of the present invention, once located within the slot the inserted negative strip 63 can be slid along the side-to-side axis 28 without removing the carrier from the slot, by releasing any pressure against the two mounting plates 12, 14 by activating the slot enlarging lever. Once the pressure is release, the negative strip 63 can be transversely slid until a selected frame is correctly centered in the combined apertures 52, 60 of the assembled plates 12, 14.

In the situation where a mounted slide is to be used, the slide is inserted in the preferred orientation between the slide tabs 70 of the upper mounting plate 14 and the filter tabs 66, thereby becoming centered with respect to the central aperture 60. As mentioned above, the lower portions of the filter tabs 66 function as slide tabs while their upper portion function as filter tabs. The desired filter sheet 64 is again inserted in the manner stated above.

Depending on the heights of each protruding tab, more then one filter sheets and mounted slides can be mounted into the upper mounting plate to provide special or specific photographic effects. Furthermore, a mounted slide 62 can be used with a filter sheet 64 and a separate negative strip 63 in position, simultaneously, for producing similar special effects such as filtered multiple exposures.

In constructing the present negative carrier 10, both plates 12, 14 are first stamped in blank form, as shown in FIG. 4 from any appropriate sheet material such as aluminum or steel. The blanks are then bent along predetermined lines to form the various tabs, side and front walls. The lower mounting plate 12 includes the additional step of securing the pins 54 to its upper surface 24. The pins 54 are preferably secured in the same fashion as securing rivets to a sheet surface, but other methods could also be implemented.

The final step is finishing the folded blanks such as painting.

What is claimed is:

1. A photographic negative carrier for supporting and aligning at least one transparent image medium with respect to a projected light of an enlarger, said carrier comprising:
   an upper mounting plate having an upper surface and a lower surface and a first rectangular aperture disposed therethrough;
   a lower mounting plate having an upper surface and a lower surface and a second rectangular aperture disposed therethrough;
   means for selectively and hingably attaching an edge of said upper mounting plate to an edge of said lower mounting plate, said hinging means operational about a hinge axis;
   means for aligning an image medium in the form of a negative strip with respect to said second aperture, said aligning means located on said upper surface of said lower mounting plate, said aligning means allowing said negative strip to be selectively slid along an axis parallel to said hinge axis so that different frames of said negative strip may be selected;
   at least one mounted slide tab located adjacent each of the four sides of said first rectangular aperture, each of said tabs protruding upwardly from said upper surface of said upper mounting plate and defining an inwardly directed surface, said tabs being spaced around said first aperture such than an image medium in the form of a mounted slide can be held by said inwardly directed surface so that the image of said mounted slide aligns with said first and second apertures;
   wherein at least two of said mounted slide tabs also assist in aligning an additional light-modifying medium with respect to said first and second apertures.

2. The photographic negative carrier according to claim 1 wherein said hingably attaching means includes at least two upwardly directed hinge tabs in said lower mounting plate and at least two hinge slots located in said upper mounting plate and positioned to receive said hinge tabs and hold said upper and lower mounting plates together.

3. The photographic negative carrier according to claim 1 wherein said upper mounting plate and said lower mounting plate are made from sheet metal by cutting said sheet metal to form a blank version including said apertures and bending said blank version to form said mounted slide tabs.

4. The photographic negative carrier according to claim 1 wherein said lower mounting plate further comprises a downwardly directed side wall portion along at least a portion of its periphery.

5. The photographic negative carrier according to claim 4 wherein said upper mounting plate further comprises an upwardly directed side wall portion along at least a portion of its periphery.

6. The photographic negative carrier according to claim 5 wherein said carrier is received by a carrier slot of an enlarger, said respective side walls along said respective peripheries of said upper and lower mounting plates are positioned adjacent said carrier slot for preventing any light from said enlarger from escaping through said carrier slot and exposing a light-sensitive photographic medium.

7. The photographic negative carrier according to claim 1 wherein said upper mounting plate and said lower mounting plate are made from plastic.

8. The photographic negative carrier according to claim 1 wherein said upper mounting plate and said lower mounting plate are made from plastic and molded together so that an integral hinge along one edge is formed, said hinge retaining alignment with said plates, while allowing one plate to move about said hinge relative to the other plate.

* * * * *